United States Patent
Lee et al.

(10) Patent No.: US 9,479,625 B2
(45) Date of Patent: Oct. 25, 2016

(54) MOBILE TERMINAL AND CONTROL METHOD THEREOF

(71) Applicant: LG ELECTRONICS INC., Seoul (KR)

(72) Inventors: Inho Lee, Seoul (KR); Wonbeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/766,244

(22) PCT Filed: Jan. 8, 2014

(86) PCT No.: PCT/KR2014/000195
§ 371 (c)(1),
(2) Date: Aug. 6, 2015

(87) PCT Pub. No.: WO2014/123306
PCT Pub. Date: Aug. 14, 2014

(65) Prior Publication Data
US 2015/0373174 A1 Dec. 24, 2015

(30) Foreign Application Priority Data
Feb. 6, 2013 (KR) .................. 10-2013-0013462

(51) Int. Cl.
*H04M 1/27* (2006.01)
*H04M 1/2745* (2006.01)
*G06K 9/00* (2006.01)
*H04M 1/725* (2006.01)

(52) U.S. Cl.
CPC .......... *H04M 1/271* (2013.01); *G06K 9/00288* (2013.01); *H04M 1/27455* (2013.01); *H04M 1/72519* (2013.01); *H04M 2250/52* (2013.01)

(58) Field of Classification Search
CPC .................. H04M 1/27455; G06K 9/00624
USPC .................. 455/556.1, 566, 550.1, 415
See application file for complete search history.

(56) References Cited

U.S. PATENT DOCUMENTS

2009/0023472 A1* 1/2009 Yoo .................. H04M 1/27455
455/556.1

(Continued)

FOREIGN PATENT DOCUMENTS

| KR | 10-2004-0050573 A | 6/2004 |
|---|---|---|
| KR | 10-2009-0008853 A | 1/2009 |
| KR | 10-2012-0036211 A | 4/2012 |

OTHER PUBLICATIONS

International Search Report and Written Opinion dated Apr. 16, 2014 issued in Application No. PCT/KR2014/000195.

*Primary Examiner* — John J Lee
(74) *Attorney, Agent, or Firm* — KED & Associates, LLP

(57) ABSTRACT

The present disclosure relates to a mobile terminal capable of displaying image data and a control method thereof. A mobile terminal according to an embodiment of the present disclosure may include a camera configured to acquire an image to generate image data containing at least one face image; a microphone configured to receive audio data; and a controller configured to analyze a face image contained in the image data to determine contact information matched to the face image, and analyze the audio data to determine contact information matched to the audio data, and match the audio data to the image data based on the determined contact information.

14 Claims, 14 Drawing Sheets

(56) References Cited

U.S. PATENT DOCUMENTS

| | | | |
|---|---|---|---|
| 2010/0119046 A1* | 5/2010 | Hoblit | H04M 1/57 379/88.03 |
| 2010/0331051 A1* | 12/2010 | Kim | H04M 1/271 455/566 |
| 2014/0055553 A1* | 2/2014 | Lee | G06K 9/00288 348/14.07 |

* cited by examiner

MOBILE TERMINAL AND CONTROL METHOD THEREOF

CROSS-REFERENCE TO RELATED PATENT APPLICATIONS

This application is a U.S. National Stage Application under 35 U.S.C. §371 of PCT Application No. PCT/KR2014/000195, filed Jan. 8, 2015, which claims priority to Korean Patent Application No. 10-2013-0013462, filed Feb. 6, 2013, whose entire disclosures are hereby incorporated by reference.

TECHNICAL FIELD

The present disclosure relates to a mobile terminal, and more particularly, to a mobile terminal capable of displaying image data and a control method thereof.

BACKGROUND ART

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the foregoing improvement, the terminal may acquire image data using a camera. Furthermore, the terminal may receive audio data using a microphone. However, there has been inconvenience that the user should directly control the terminal to display image data as well as control the terminal to output audio data in order to display the image data while at the same time outputting the audio data.

DISCLOSURE OF INVENTION

Technical Problem

An objective of the present disclosure is to provide a mobile terminal and control method thereof capable of storing audio data associated with image data along with the image data.

Solution to Problem

A mobile terminal according to an embodiment of the present disclosure may include a camera configured to acquire an image to generate image data containing at least one face image; a microphone configured to receive audio data; and a controller configured to analyze a face image contained in the image data to determine contact information corresponding to the face image, and analyze the audio data to determine contact information matched to the audio data, and match the audio data to the image data based on the determined contact information.

According to an embodiment, the mobile terminal may further include a display unit, wherein the controller matches the audio data to the face image contained in the image data based on the determined contact information, and displays an object indicating that the audio data is matched to the face image along with the face image.

According to an embodiment, the mobile terminal may further include an audio output module, wherein the controller outputs audio data matched to a face image corresponding to the object through the audio output module when the object is selected.

According to an embodiment, the controller may detect contact information matched to a face image corresponding to the object, and display an audio data list containing at least one audio data item matched to the contact information on the display unit when a preset touch input is sensed on the object.

According to an embodiment, the controller may display information associated with the at least one audio data item, respectively, on the audio data list.

According to an embodiment, the associated information may include at least one of source information, generation time information and play time information of the at least one audio data, respectively.

According to an embodiment, when contact information matched to at least one of the face image and the audio data is not stored, the controller may receive contact information matched to the at least one, and generate a database containing the at least one and the contact information.

According to an embodiment, the display unit may display a contact list containing at least one contact item, and the controller may display an object indicating that the contact information is matched to at least one of the face image and the audio data on a contact item corresponding to the contact information.

According to an embodiment, when contact information matched to the audio data is not stored, the controller may convert the audio data into text data, and display an object containing the text data to be overlapped with the image data, and determine contact information matched to the audio data based on a touch input to the object containing the text data, and generate a database containing the audio data and the determined contact information.

According to an embodiment, the controller may analyze the attribute information of the audio data, and store the attribute information of the audio data matched to the determined contact information in the generated database.

According to an embodiment, the attribute information may include at least one of the frequency information, harmonic information and audio information of the audio data.

According to an embodiment, when image data containing a face image is received from a server, the controller may receive contact information matched to the received face image, and generate a database containing the face image and the contact information.

A control method of a mobile terminal according to an embodiment of the present disclosure may include acquiring an image from a camera to generate image data containing at least one face image; receiving audio data from a microphone; analyzing a face image contained in the image data to determine contact information corresponding to the face image, and analyzing the audio data to determine contact information matched to the audio data; and matching the audio data to the image data based on the determined contact information.

According to an embodiment, said matching the audio data to the image data based on the determined contact information may include matching the audio data to the face image contained in the image data based on the determined contact information; and displaying an object indicating that the audio data is matched to the face image along with the face image.

According to an embodiment, the control method of the mobile terminal may further include outputting audio data matched to a face image corresponding to the object through the audio output module when the object is selected.

According to an embodiment, said matching the audio data to the face image contained in the image data based on the determined contact information may include receiving contact information matched to at least one of the face image and the audio data when contact information matched to the at least one of the face image and the audio data is not stored; and generating a database containing the at least one and the contact information.

Advantageous Effects of Invention

According to the present disclosure, contact information matched to image data and contact information matched to audio data may be determined, respectively, within the terminal. Accordingly, it may be possible to reduce an error due to a user's wrong manipulation that can be generated during the process of allowing the user to directly enter contact information matched to image data and contact information matched to audio data. As a result, the user's convenience can be enhanced.

MODE FOR THE INVENTION

Figure 1:
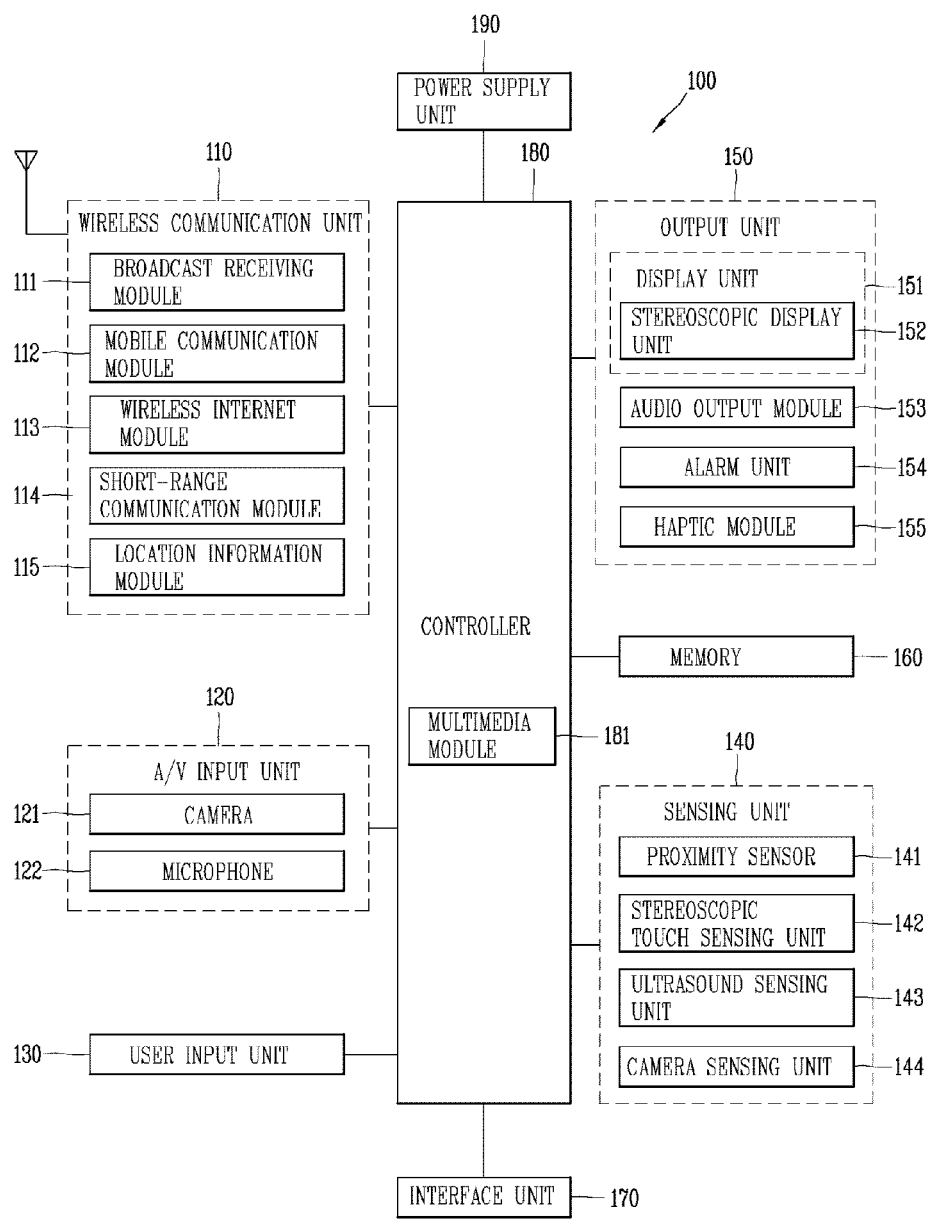
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (AN) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
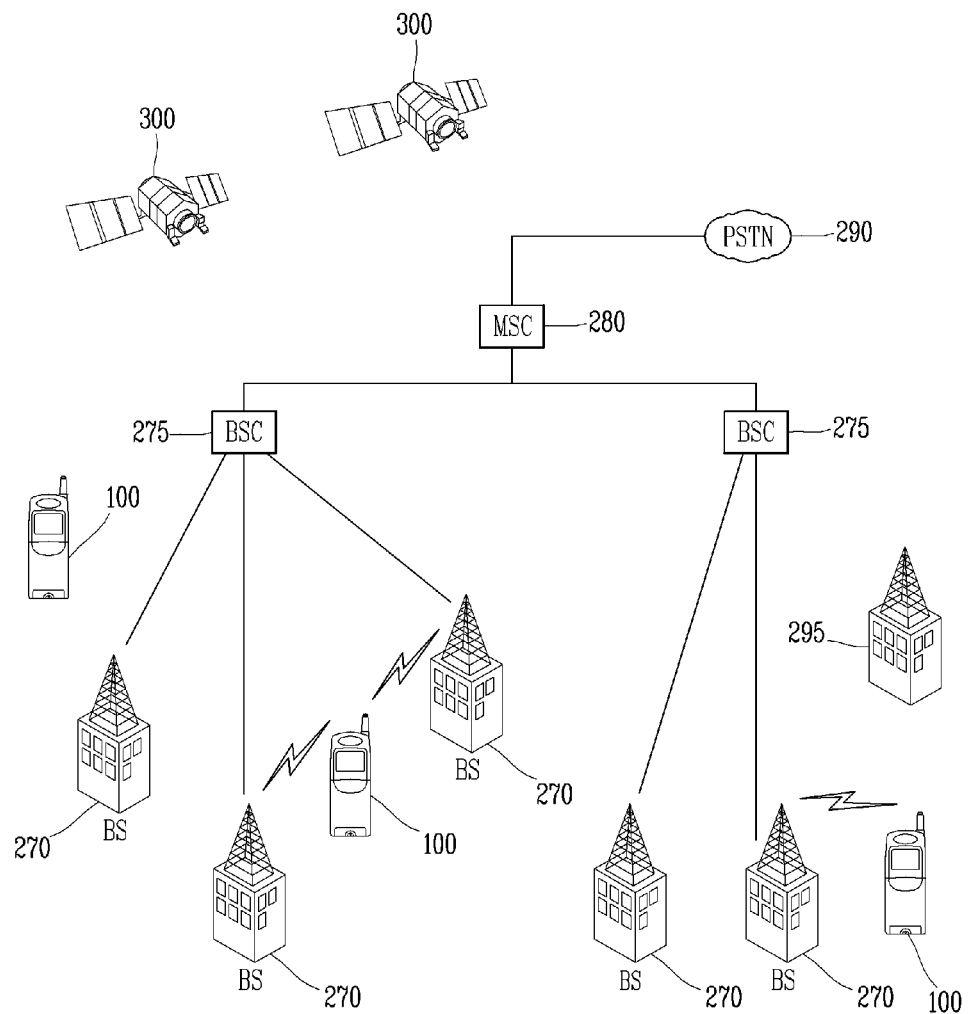
FIGS. 2A and 2B are conceptual views illustrating a communication system in which a mobile terminal according to the present disclosure is operable.
Figure 2B:
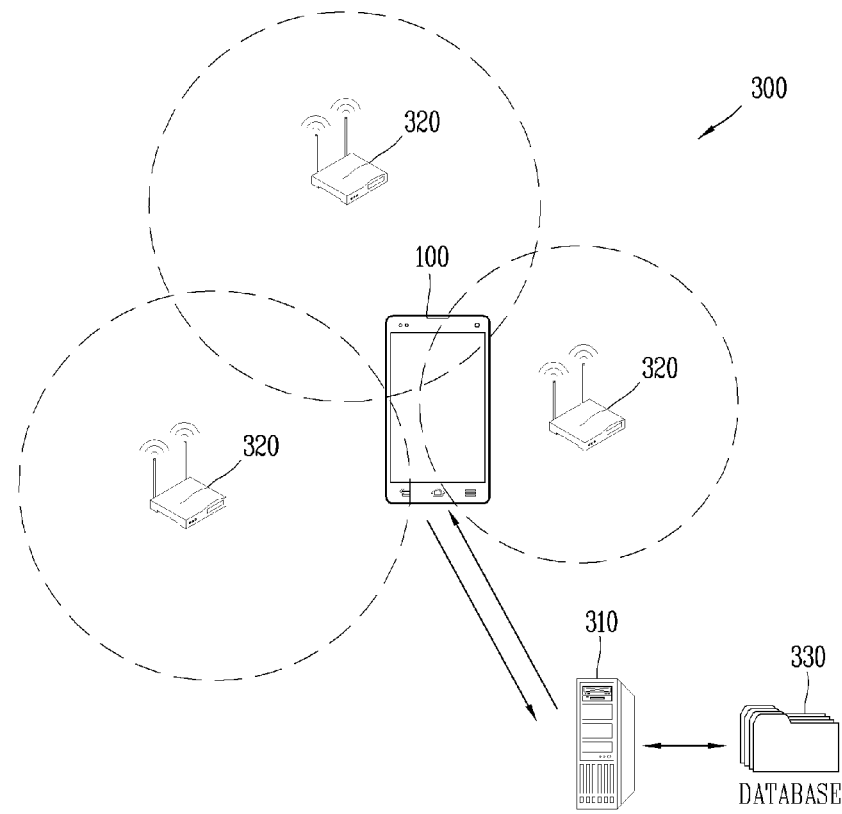

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
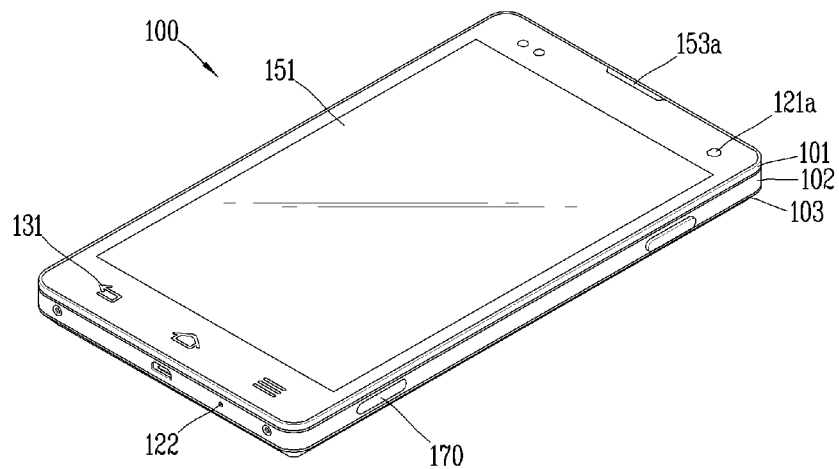
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
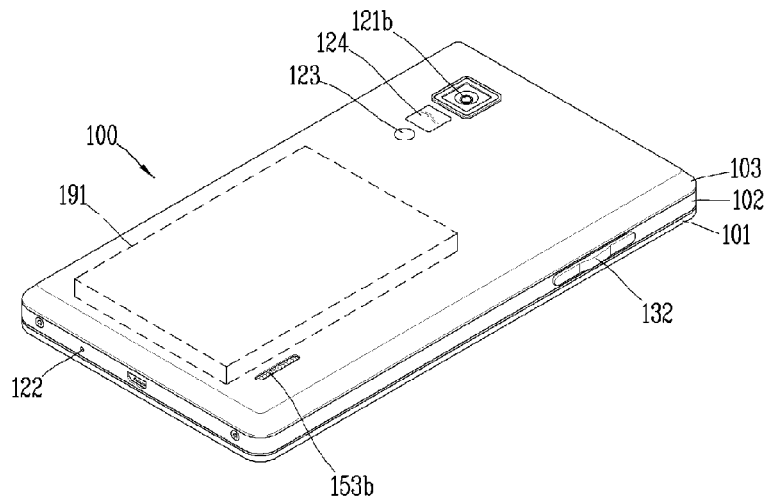
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, the mobile terminal 100 may acquire image data using the camera 121. Furthermore, the mobile terminal 100 may receive audio data using the microphone 122. However, there has been inconvenience that the user should directly control the mobile terminal 100 to display image data as well as control the mobile terminal 100 to output audio data in order to display the image data while at the same time outputting the audio data.

Accordingly, hereinafter, a mobile terminal 100 and a control method thereof capable of storing audio data associated with image data along with the image data will be described with reference to the accompanying drawings.

Figure 4:
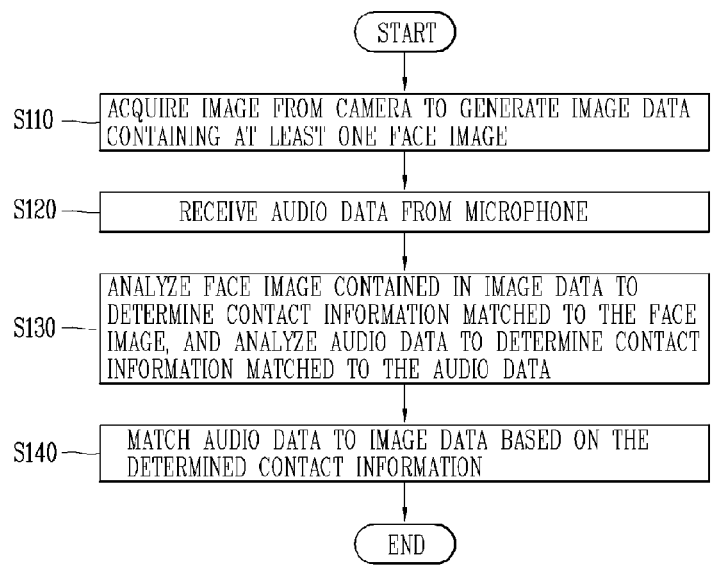
FIG. 4 is a flow chart for explaining a mobile terminal according to an embodiment of the present disclosure.

FIG. 4 is a flow chart for explaining the mobile terminal 100 (refer to FIG. 1) according to an embodiment of the present disclosure. The mobile terminal 100 may include a camera 121 (refer to FIG. 1), a microphone 122 (refer to FIG. 1), and a controller 180 (refer to FIG. 1).

Referring to FIG. 4, first, the process (S110) of acquiring an image from the camera 121 to generate image data including at least one face image is carried out.

The memory 160 (refer to FIG. 1) may store the generated image data. Here, the image data may be image data acquired from the camera 121, and otherwise, though not shown in the drawing, may be image data received from a network server or another terminal.

Next, the process (S120) of receiving audio data from the microphone 122 is carried out.

The memory 160 may store the received audio data. Here, the audio data may be audio data received from the microphone 122, and otherwise, though not shown in the drawing, may be audio data received from a network server or another terminal.

On the other hand, the controller 180 may receive audio data from the microphone 122 while at the same time acquiring image data using the camera 121.

Then, the process (S130) of determining contact information matched to a face image contained in the image data and determining contact information matched to the audio data is carried out.

The controller 180 may compare a face image contained in the image data with basic face images corresponding to the contact items, respectively, and determine a contact item matched to the face image contained in the image data based on the comparison result. To this end, the process of configuring a basic face image for the contact item may be precedently carried out.

Furthermore, the controller 180 may analyze the attribute information of the received audio data. The controller 180 may compare the attribute information of the audio data with the attribute information of audio data corresponding to the contact items, respectively, and determine a contact item matched to the audio data based on the comparison result. To this end, the process of configuring the attribute information of the audio data for the contact item may be precedently carried out.

Then, the process (S140) of matching audio data to image data based on the determined contact information is carried out.

When contact information matched to a face image contained in image data is identical to contact information matched to audio data, the controller 180 may match the audio data to the face image. The controller 180 may display an object indicating that the audio data is matched to the face image along with the face image.

Then, though not shown in the drawing, when an object displayed along with the face image is selected, the controller 180 may output audio data matched to a face image corresponding to the object through the audio output module 153 (refer to FIG. 1).

As described above, according to the present disclosure, contact information matched to image data and contact information matched to audio data may be determined, respectively, within the mobile terminal 100. Accordingly, it may be possible to reduce an error due to a user's wrong manipulation that can be generated during the process of allowing the user to directly enter contact information matched to image data and contact information matched to audio data. As a result, the user's convenience can be enhanced.

Figure 5:
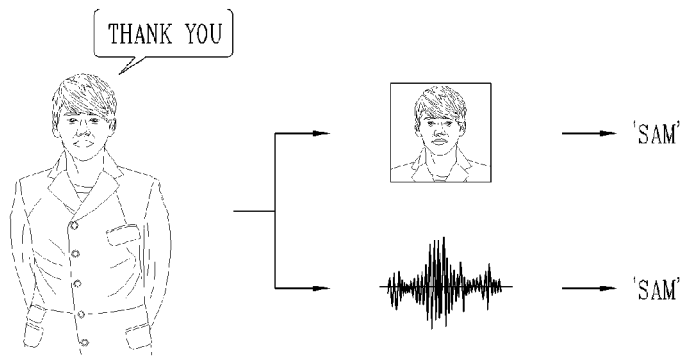
FIGS. 5 and 6 are conceptual views illustrating an operation example in which contact information matched to audio data is determined and contact information matched to image data is determined.
Figure 6:
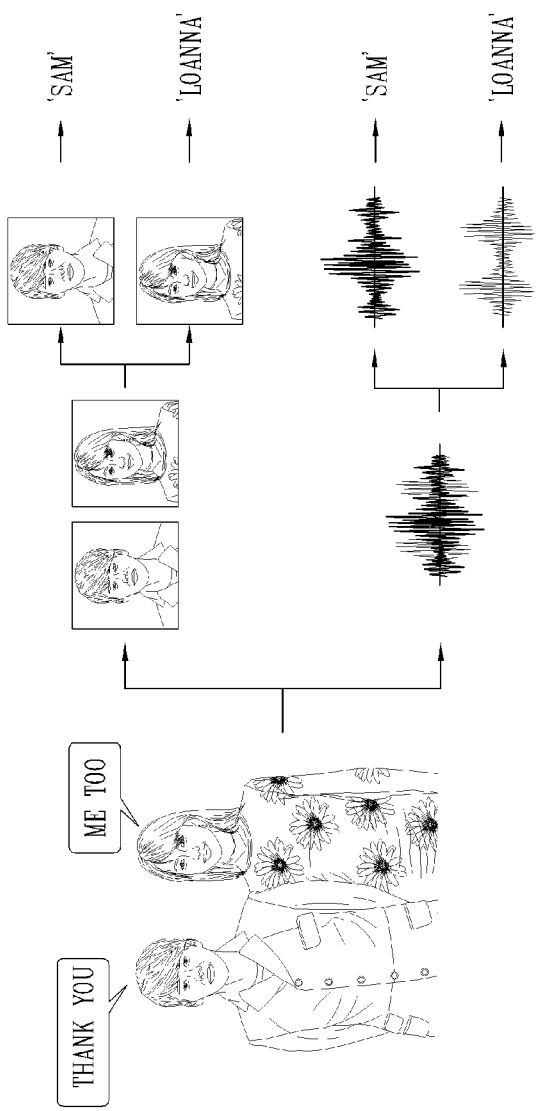

FIGS. 5 and 6 are conceptual views illustrating an operation example in which contact information matched to audio data is determined and contact information matched to image data is determined.

Referring to FIG. 5, the controller 180 may acquire image data containing the user's face image by capturing the user through the camera 121. Furthermore, the controller 180 may receive audio data from the user through the microphone 122.

The controller 180 may extract a face image from the acquired image data. The controller 180 may determine a contact item matched to the face image using a face recognition algorithm.

Specifically, the controller 180 may compare the face image with basic face images corresponding to contact items, respectively, and determine a contact item (for example, "Sam") matched to the face image contained in the image data.

On the other hand, the controller 180 may detect the attribute information of the received audio data. Here, the attribute information of the audio data may include at least one of the frequency information, harmonic information and audio information of the audio data. The controller 180 may determine a contact item matched to audio data using a speaker recognition algorithm.

Specifically, the controller 180 may compare the attribute information of the detected audio data with the attribute information of audio data corresponding to contact items, respectively. The controller 180 may determine a contact item (for example, "Sam") matched to the attribute information of the detected audio data using a likelihood-based reliability.

Referring to FIG. 6, the controller 180 may acquire image data containing the face images of the first and the second user (hereinafter, referred to as "a first and a second face image") by capturing a plurality of users (hereinafter, referred to as "a first and a second user") through the camera 121. Furthermore, the controller 180 may receive audio data (hereinafter, referred to as "first and second audio data") from the first and the second user, respectively, through the microphone 122.

The controller 180 may extract a first and a second face image from the acquired image data. The controller 180 may determine contact items (for example, "Sam" and "Loanna") matched to the first and the second face image, respectively, using a face recognition algorithm.

Furthermore, the controller 180 may classify the received audio data into first and second audio data. The first and the second audio data may have different attribute information to be classified by the controller 180. The controller 180 may determine contact items (for example, "Sam" and "Loanna") matched to the first and the second audio data, respectively, using a speaker recognition algorithm.

Figure 7:
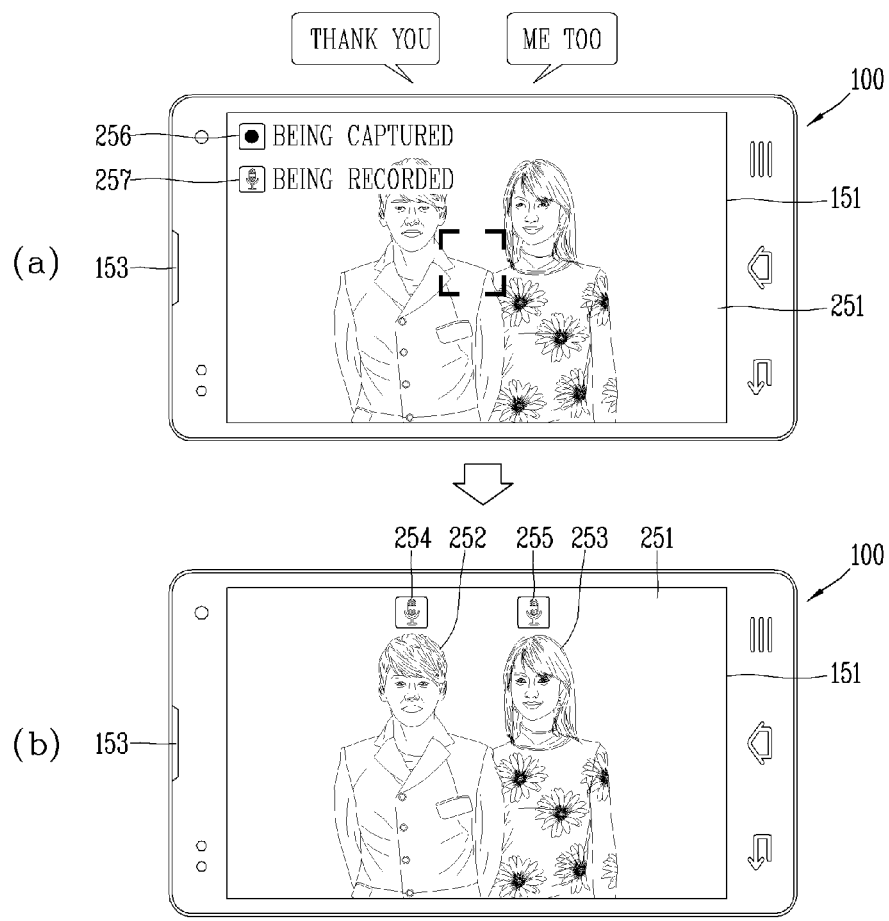
FIGS. 7 and 8 are conceptual views illustrating a user interface through which audio data is output while display image data.
Figure 8:
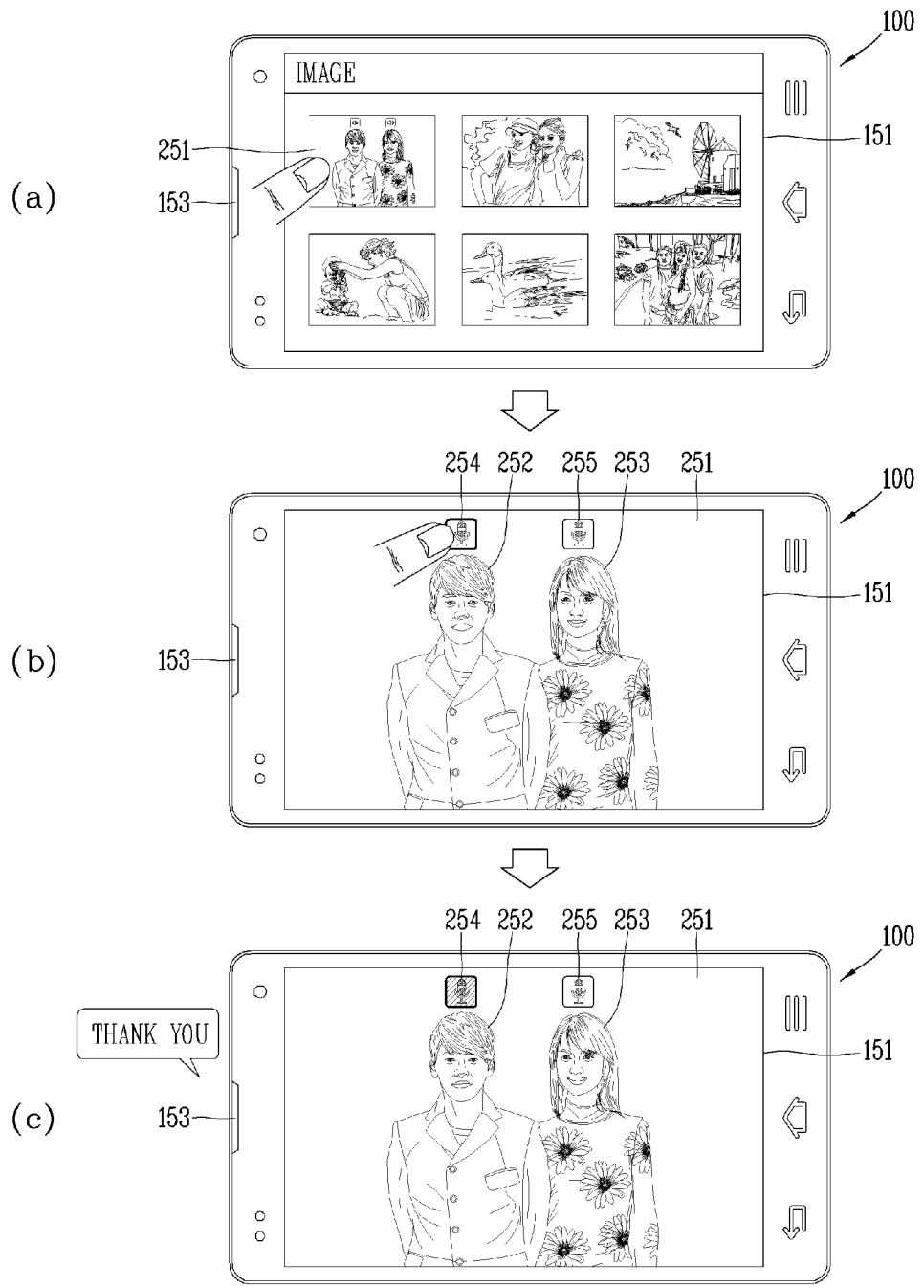

FIGS. 7 and 8 are conceptual views illustrating a user interface through which audio data is output while display image data.

Referring to FIG. 7, the camera 121 may acquire image data 251 by capturing the first and the second user. At the same time, the microphone 122 may receive audio data from the first and the second user.

At this time, the display unit 151 may display an icon 256 indicating that the camera 121 acquires the image data 251 and an icon 257 indicating that the microphone 122 receives audio data.

The controller 180 may extract a first and a second face image 252, 253 from the acquired image data 251, and detect first and second user information corresponding to the first and the second face image 252, 253, respectively. The controller 180 may match the first and the second user information to the first and the second face image 252, 253, respectively.

Furthermore, the controller 180 may classify the received audio data into the first and the second audio data, and detect the first and the second user information corresponding to the first and the second audio data, respectively, using a speaker recognition algorithm.

As a result, referring to FIG. 7B, the controller 180 may match the first and the second audio data to the first and the second face image 252, 253, respectively. Accordingly, as illustrated in the drawing, the controller 180 may display a first object 254 indicating that the first audio data is matched to the first face image 252 along with the first face image 252. Furthermore, the controller 180 may display a second object 255 indicating that the second audio data is matched to the second face image 253 along with the second face image 253.

Referring to FIG. 8A, the controller 180 may display an image data list. The image data list may include thumbnail images corresponding to a plurality of image data, respectively.

As illustrated in the drawing, an object indicating whether or not audio data matched to the corresponding image data is stored may be displayed on the thumbnail images.

When any one thumbnail image is selected from the image data list, as illustrated in FIG. 8B, the controller 180 may display image data 251 corresponding to the selected thumbnail image on the display unit 151.

As illustrated in the drawing, the image data 251 may include at least one face image (the first and the second face image 252, 253). Furthermore, the first and the second object 254, 255 indicating that the first and the second audio data are matched to the first and the second face image 252, 253, respectively, may be displayed on the image data 251.

Then, when any one (for example, the first object 254) of the first and the second object 254, 255 is selected, as illustrated in FIG. 8C, the controller 180 may output the first audio data (for example, "Thank you") matched to the first face image 252 corresponding to the selected first object 254 through the audio output module 153.

At the same time, the controller 180 may change at least one of the color, shape, transparency and size of the first object 254 for a preset period of time, thereby visually exhibiting that the first audio data matched to the first face image 252 corresponding to the first object 254 is currently output.

Though not shown in the drawing, when a preset region containing the first and the second face image 252, 253 is selected even though the first and the second object 254, 255 are not displayed on the image data 251, the controller 180 may display audio data matched to a face image contained in the selected region through the audio output module 153. To this end, the coordinate information of the selected region may be used.

Figure 9:
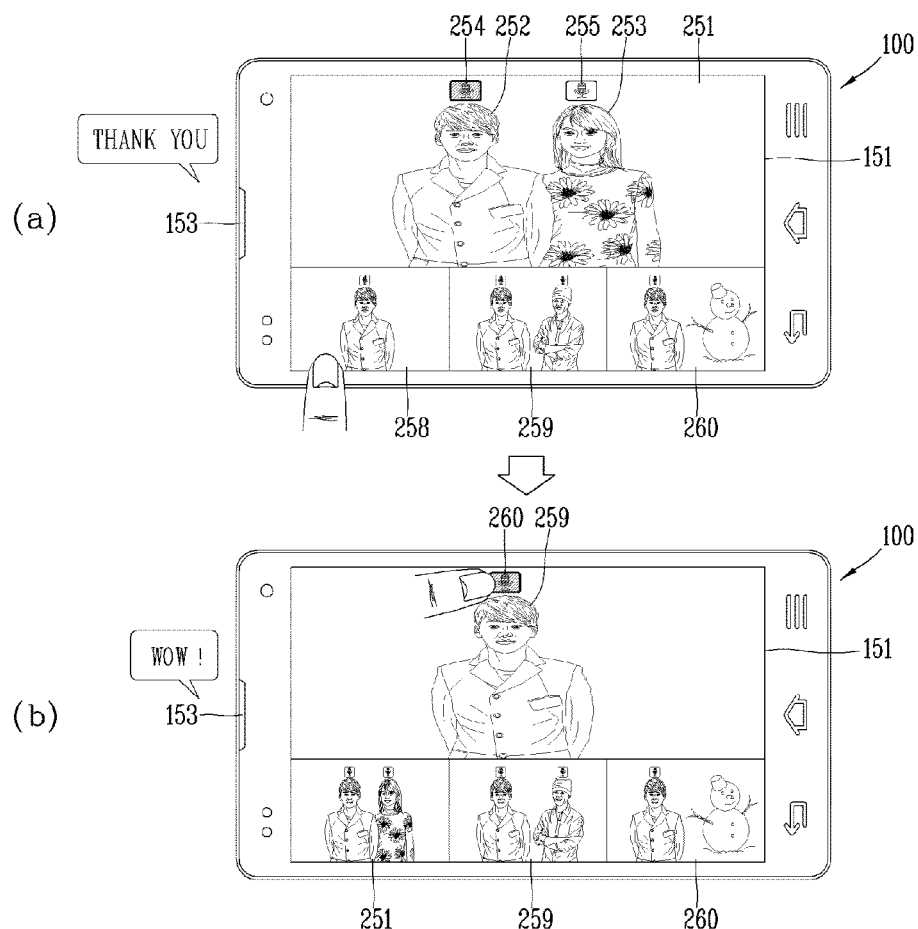
FIGS. 9 through 11 are conceptual views illustrating a user interface on which an audio data list or image data list associated with the selected contact information is displayed.
Figure 10:
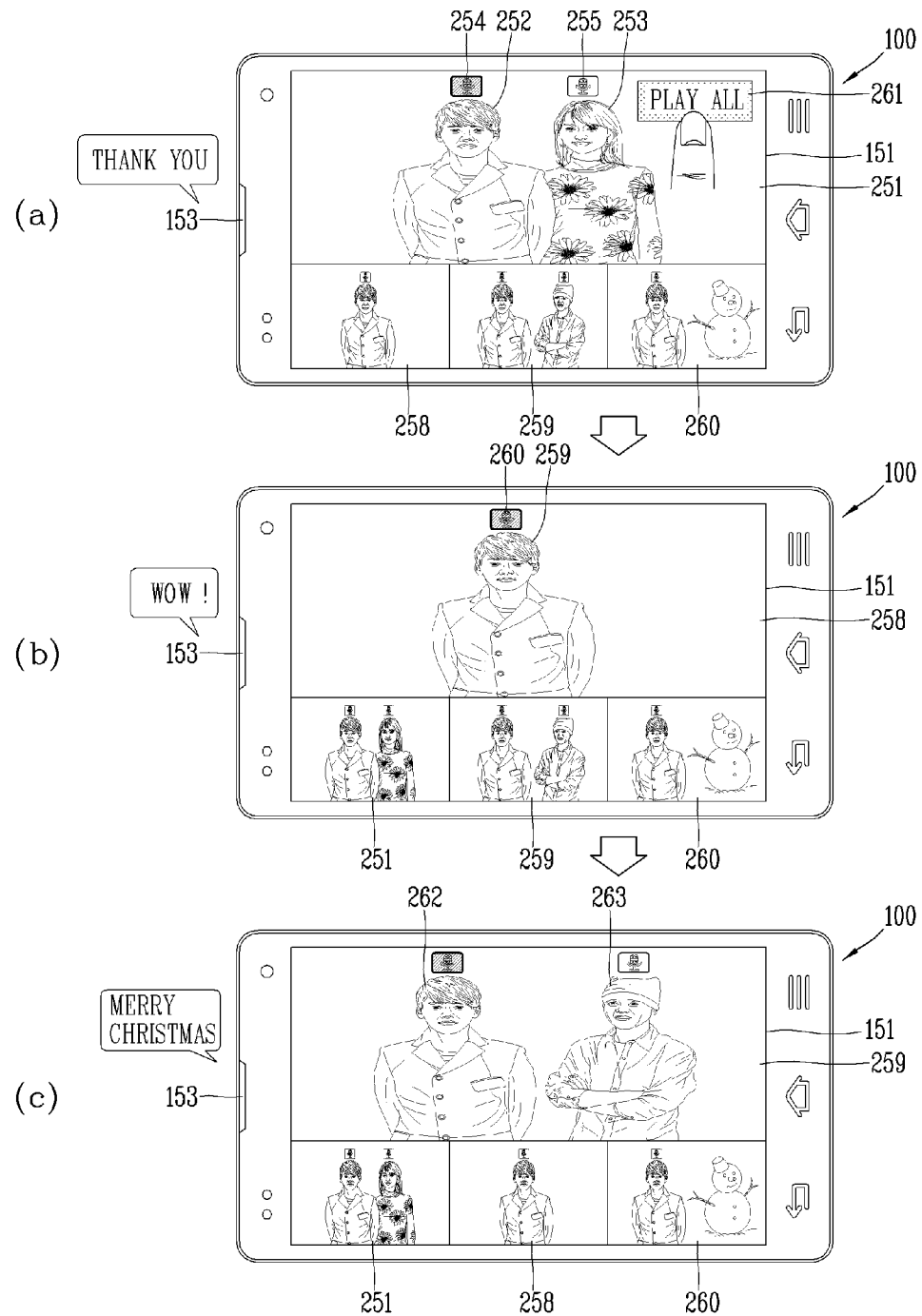
Figure 11:
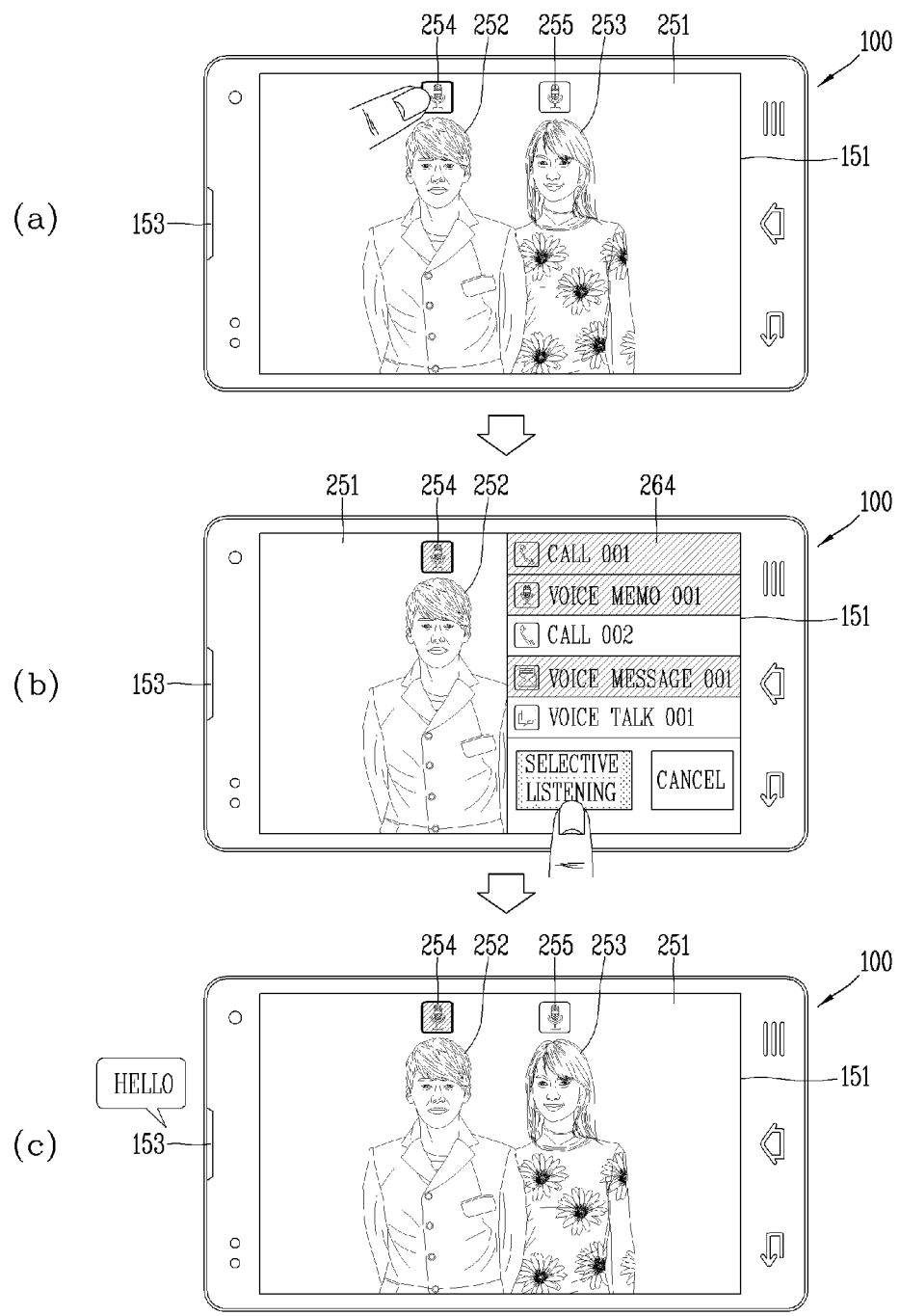

FIGS. 9 through 11 are conceptual views illustrating a user interface on which an audio data list or image data list associated with the selected contact information is displayed.

Referring to FIG. 9A, the camera 121 may acquire the image data 251. The controller 180 may display the acquired image data 251 in the central region of the display unit 151. As illustrated in the drawing, the image data 251 may include at least one face image (the first and the second face image 252, 253).

At this time, when the first object 254 displayed along with the first face image 252 is selected, the controller 180 may output the first audio data (for example, "Thank you") matched to the first face image 252 through the audio output module 153.

On the other hand, as the first object 254 is selected, the controller 180 may detect first user information corresponding to the first face image 252, and detect the other image data 258-260 associated with the first user information from the memory 160. The controller 180 may display the detected other image data 258-260 in the form of thumbnail images in one region of the display unit 151.

At this time, when any one 258 of the other image data 258-260 is selected, as illustrated in FIG. 9B, the controller 180 may display the selected image data 258 in the central region of the display unit 151. When an object 260 displayed along with the selected image data 258 is selected, the controller 180 may output audio data (for example, "Wow") matched to the face image 259 contained in the selected image data 258 through the audio output module 153.

On the other hand, though not shown in the drawing, when the image data 251 is displayed on the display unit 151, the controller 180 may immediately detect the first and the second user information corresponding to the first and the second face image 252, 253, respectively, and detect the other image data associated with the first and the second user information from the memory 160.

Referring to FIG. 10A, the controller 180 may display the image data 251 containing the first face image 252 corresponding to the first user information in the central region of the display unit 151. At the same time, the controller 180 may display the other image data 258-260 associated with the first user information in the form of thumbnail images in one region of the display unit 151.

The display unit 151 may display an icon (hereinafter, referred to as a "play all icon") 261 corresponding to the function of outputting all audio data associated with the first user information. When the play all icon 261 is selected, the controller 180 may output all audio data associated with the first user information.

Specifically, as illustrated in FIG. 10B, the controller 180 may output audio data (for example, "Wow") matched to a face image 259 contained in the first image data 258 while displaying the first image data 258 of the other image data 258-260 in the central region of the display unit 151.

Then, as illustrated in FIG. 10C, the controller 180 may output audio data (for example, "Merry Christmas") matched to a face image 262 contained in the second image data 259 while displaying the second image data 259 of the other image data 258-260 in the central region of the display unit 151.

Referring to FIG. 11A, the controller 180 may display the image data 251 containing the first and the second face image 252, 253 corresponding to the first and the second user information on the display unit 151. At the same time, the controller 180 may display a first object 254 indicating that the first audio data is matched to the first face image 252 and a second object 255 indicating that the second audio data is matched to the second face image 253 on the display unit 151.

When the first object 254 is selected, the controller 180 may detect the first user information as contact information matched to the first face image 252 corresponding to the first object 254. At this time, the controller 180 may change at least one of the color, shape, transparency and size of the first object 254 for a preset period of time, thereby exhibiting that the first object 254 is currently selected.

Then, referring to FIG. 11B, the controller 180 may display an audio data list 264 containing at least one audio data item matched to the first user information on the display unit 151.

The controller 180 may display information associated with the audio data item on the audio data list 264. Here, the associated information may include at least one of source information, generation time information and play time information of the audio data, respectively.

For example, as illustrated in the drawing, icons corresponding to a phone call, a voice memo, a voice message and a voice talk, and the like may be displayed on the audio data list 264 as the source information of the audio data, respectively.

At this time, when at least one audio data item is selected from the audio data list 264, as illustrated in FIG. 11C, the controller 180 may continuously output the selected audio data. At the same time, the controller 180 may change at least one of the color, shape, transparency and size of the first object 254 for a preset period of time, thereby exhibiting that audio data associated with the first user information corresponding to the first object 254 is being currently output.

On the other hand, though not shown in the drawing, the controller 180 may continuously output all the audio data associated with the first user information regardless of the user's selection.

Furthermore, though not shown in the drawing, the controller 180 may change audio data matched to the first face image 253 to another audio data selected by the user based on the user's selection. Moreover, the controller 180 may edit, delete or add audio data matched to the first face image 253.

Figure 12:
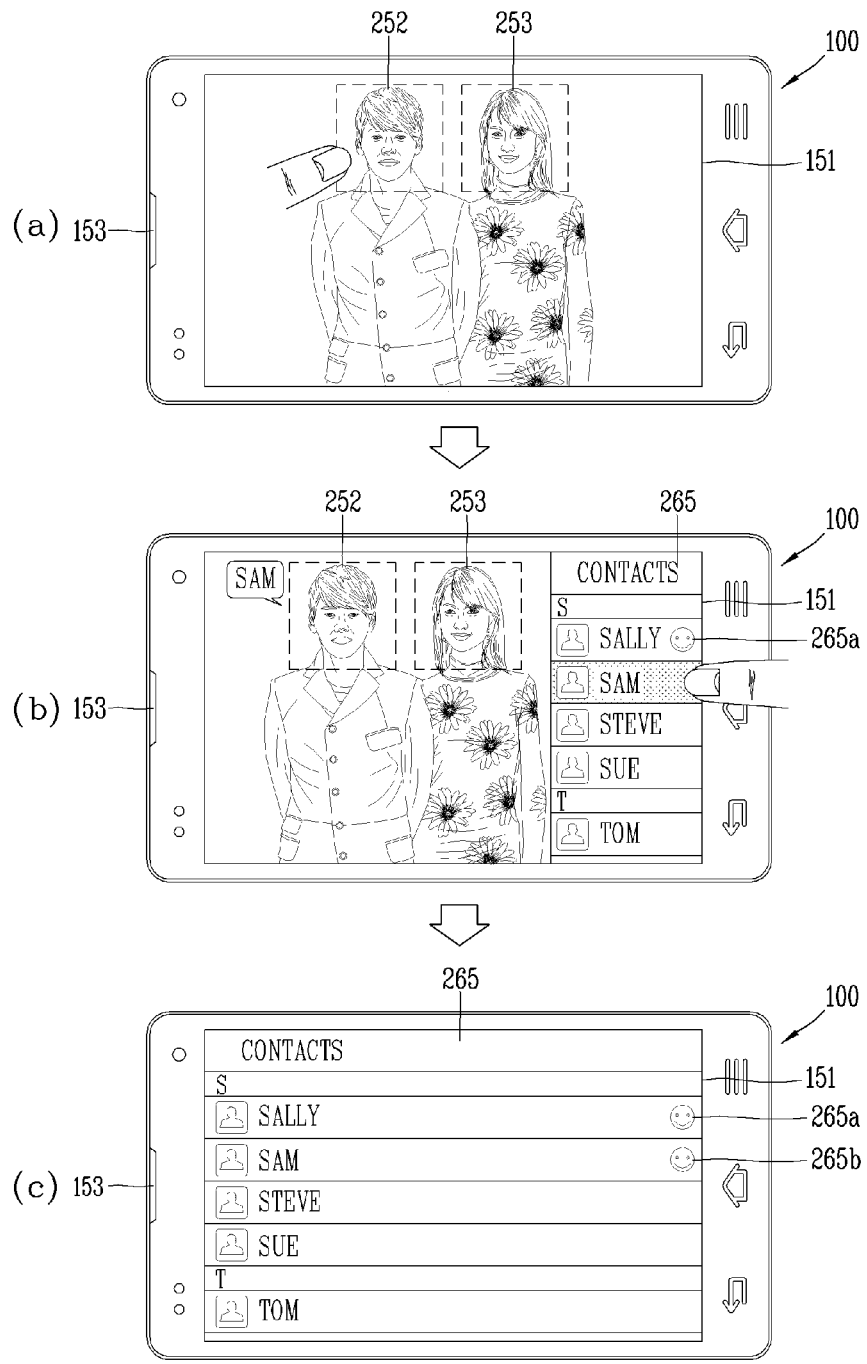
FIGS. 12 and 13 are conceptual views illustrating a user interface when contact information matched to a face image contained in the acquired image data is not stored.
Figure 13:
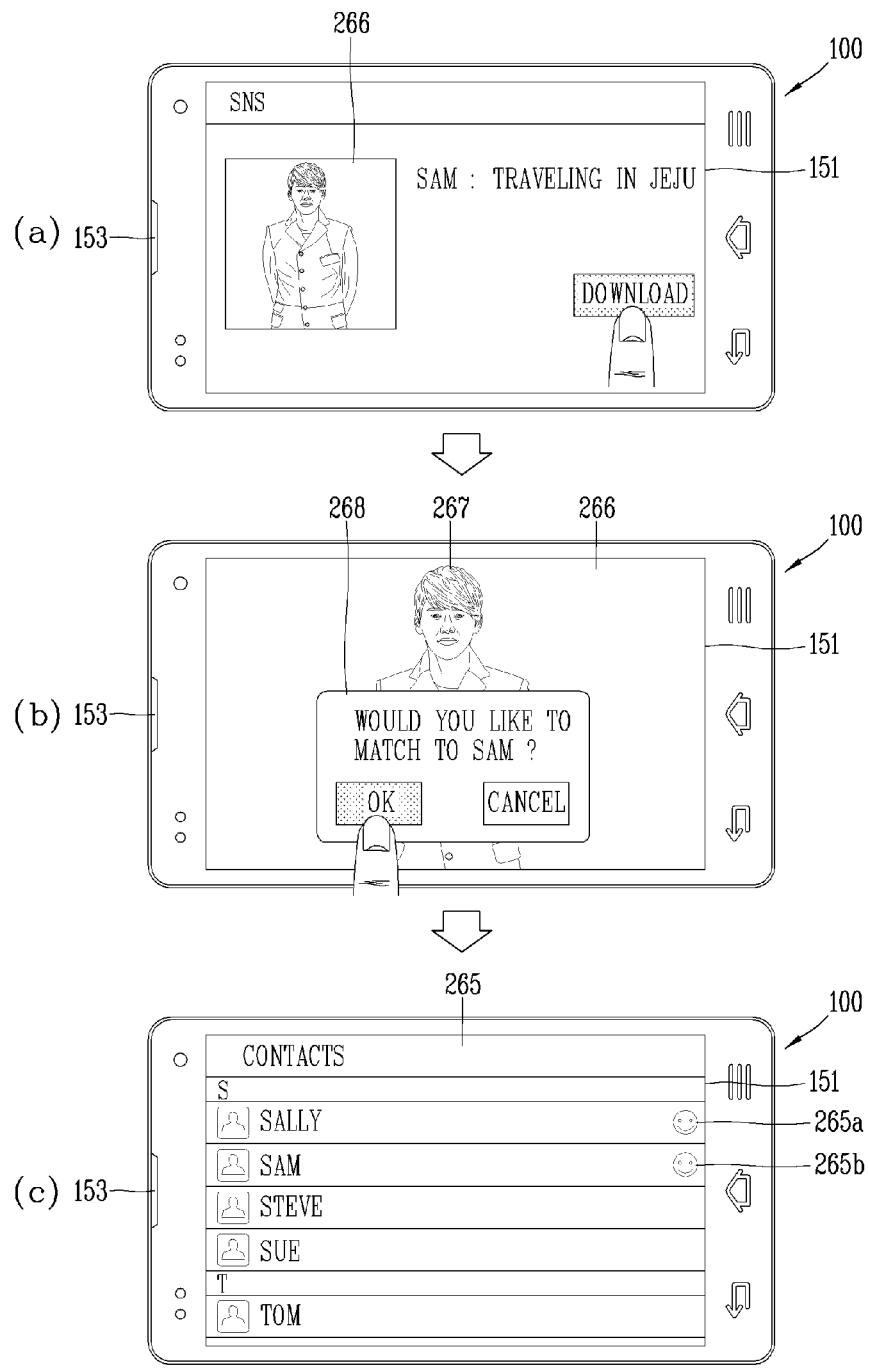

FIGS. 12 and 13 are conceptual views illustrating a user interface when contact information matched to a face image contained in the acquired image data is not stored.

The controller 180 may receive contact information matched to a face image when contact information matched to the face image is not stored. The controller 180 may generate a database containing the face image and the received contact information. When a face image database generation icon displayed on a notification window is selected, a screen for receiving contact information matched to the face image may be displayed on the display unit 151.

Referring to FIG. 12A, the display unit 151 may display the acquired image data 251. The controller 180 may extract the first and the second face image 252, 253 contained in the image data 251, and display the first and the second face image 252, 253 in a highlighted manner.

When either one of the first and the second face image 252, 253 is selected, as illustrated in FIG. 12B, the controller 180 may divide the screen into a plurality of regions, and display the first face image 252 in a highlighted manner in one region, and display a contact list 265 containing the contact item in the other region.

Here, the contact items may be displayed in various orders. As illustrated in the drawing, the contact items may be displayed in an alphabetical order. Though not shown in the drawing, the contact items may be displayed in the order of higher contact frequency. Furthermore, the gender of the highlighted first face image 252 is detected, and only some of the contact items may be displayed based on the detected gender. Furthermore, contact items that have been previously matched with face images may not be displayed on the display unit 151.

On the other hand, as illustrated in the drawing, on a contact item (for example, "Sally") previously matched with a face image, the controller 180 may display an icon 265a indicating that the face image is matched thereto.

Referring to FIG. 12B again, when a contact item (for example, "Sam") matched to the first face image 252 of the contact items is selected, the controller 180 may display an indicator indicating it along with the first face image 252. The indicator may include an icon indicating a contact item (for example, "Sam") assigned to the first face image 252.

Then, referring to FIG. 12C, the controller 180 may switch the screen, and display a contact list 265 containing contact items on the switched screen. The controller 180 may display an icon 265b indicating that the first face image 252 is matched to "Sam" on a contact item for "Sam".

On the other hand, though not shown in the drawing, a face image assigned to a thumbnail image indicating the contact item may be reflected. In other words, as a thumbnail image indicating the contact item (for example, "Sam"), the first face image 252 may be assigned thereto.

Referring to FIG. 13A, the controller 180 may receive image data 266 containing a face image 267 from a server. The controller 180 may receive user information associated with the image data 266, for example, user information that uploads the image data 266 and user information tagged to the image data 266 at the same time, along with the image data 266.

Next, referring to FIGS. 13B and 13C, the controller 180 may detect a face image 267 from the received image data 266, and display a popup window 267 asking whether or not to match the face image 267 to user information associated with the image data 266.

Then, the controller 180 may match the face image 267 to user information associated with the image data 266 based on the user's selection.

On the other hand, though not shown in the drawing, the controller 180 may receive the image data 266, and receive user information matched to the face image 267 contained in the received image data 266 directly from the user.

When an image data database generation icon displayed on the notification window is selected, a screen for receiving contact information matched to image data may be displayed on the display unit 151.

Figure 14:
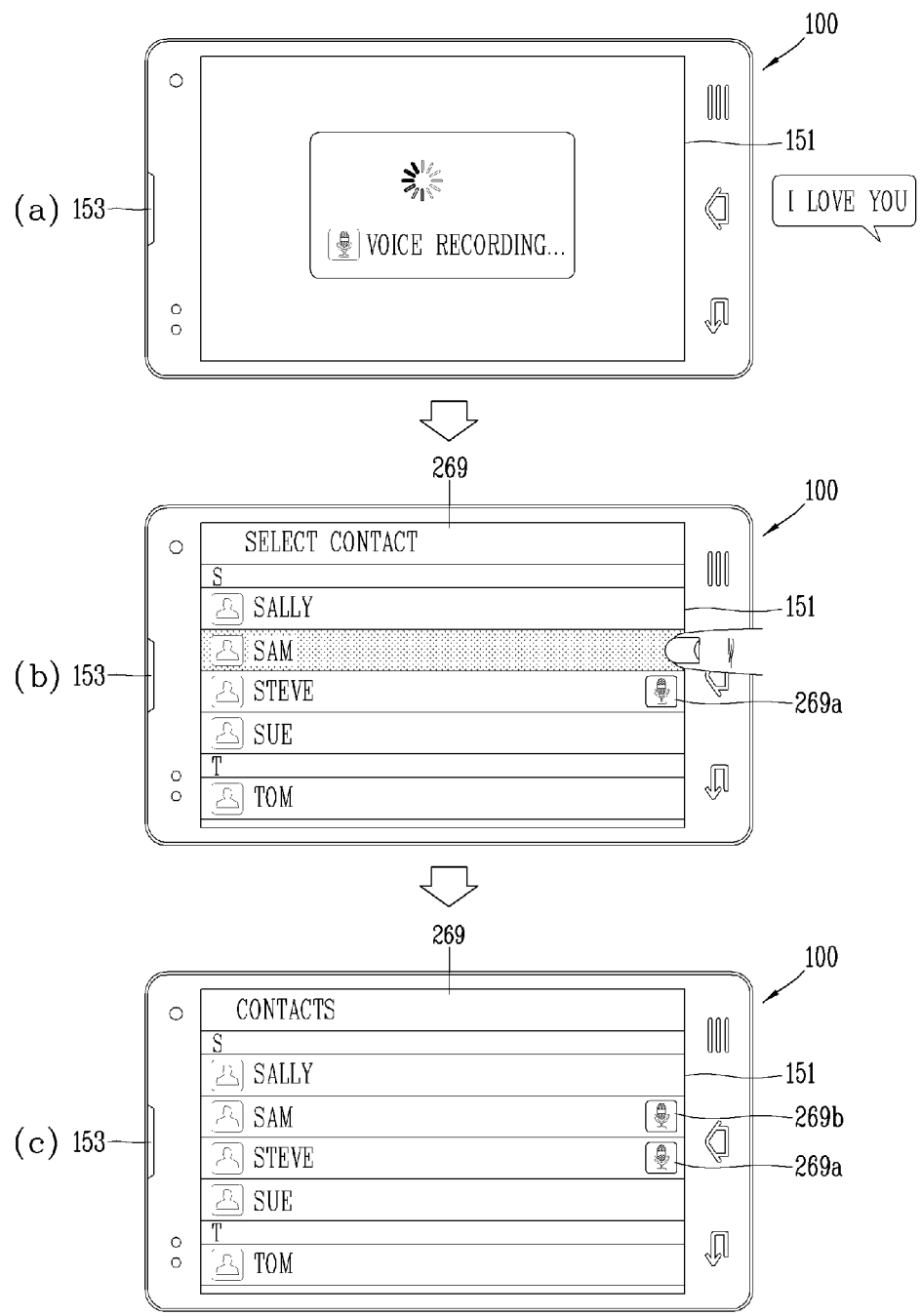
FIGS. 14 and 15 are conceptual views illustrating a user interface when contact information matched to the received audio data is not stored.
Figure 15:
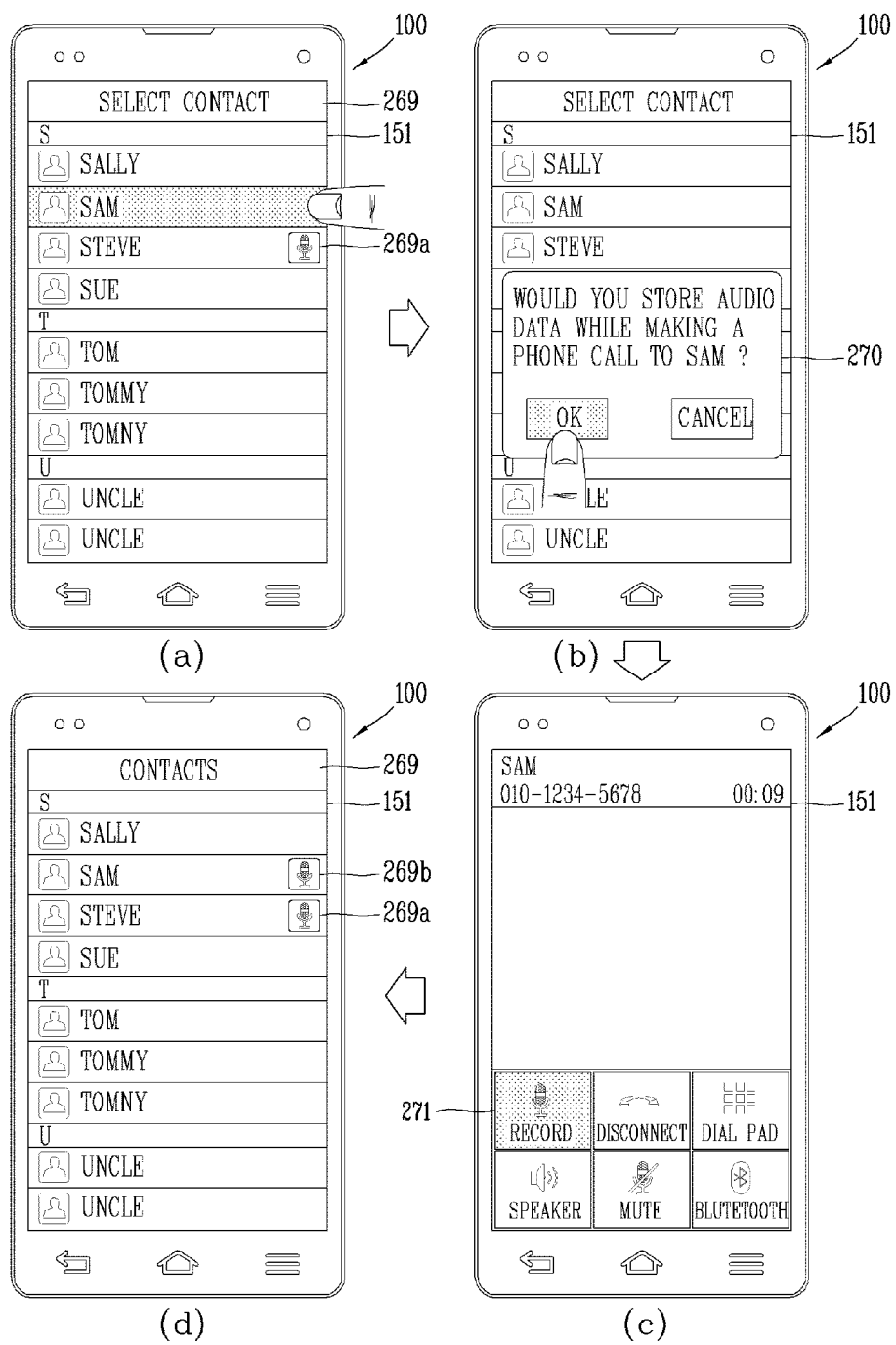

FIGS. 14 and 15 are conceptual views illustrating a user interface when contact information matched to the received audio data is not stored.

When contact information matched to audio data is not stored, the controller 180 may receive contact information matched to the audio data. The controller 180 may generate a database containing the audio data and the received contact information.

Referring to FIG. 14A, the controller 180 may receive audio data from the microphone 122. When the audio data is received, as illustrated in FIG. 14B, the controller 180 may display a contact list 269 containing contact items. At this time, for a contact item (for example, "Steve") previously matched with audio data, the controller 180 may display an icon 269a indicating that audio data has been matched thereto.

Then, when a contact item (for example, "Sam") matched to audio data among the contact items is selected, the controller 180 may display an icon 269b indicating that audio data is matched to "Sam" on a contact item for "Sam".

On the other hand, though not shown in the drawing, when audio data is received, the controller 180 may convert the received audio data into text data, and display an object containing the text data to be overlapped with the image data.

Furthermore, the controller 180 may determine contact information matched to the audio data based on a touch input to the object containing the text data. Specifically, when a preset touch input is sensed on the object containing the text data, the controller 180 may display a contact list containing contact items. Then, the controller 180 may match a contact item selected from the contact list to the audio data.

In addition, though not shown in the drawing, the controller 180 may display an object containing the text data to be overlapped with the image data in a state that the image data matched to a plurality of user information, respectively, are displayed on the display unit 151. The controller 180 may determine contact information matched to audio data based on an object containing the text data being dragged in which direction of a plurality of face images corresponding to a plurality of user information contained in image data.

Referring to FIGS. 15A and 15B, the display unit 151 may display a contact list containing a plurality of contact items. At this time, a contact item in which audio data is to be stored when making a voice phone call later may be selected from the contact items.

Then, referring to FIG. 15C, when performing a voice phone call with the counterpart corresponding to the selected contact item, audio data may be stored. At this time, an object 271 indicating that audio data is being recorded may be displayed in a highlighted manner.

The controller 180 may match the recorded audio data to the selected contact item. Moreover, referring to FIG. 15D, the controller 180 may display an icon 269b indicating that audio data is matched to "Sam" on a contact item for "Sam".

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

The invention claimed is:

1. A mobile terminal, comprising:
   a display unit;
   a camera configured to acquire an image to generate image data containing at least one face image;
   a microphone configured to receive audio data; and
   a controller configured to:
     analyze a face image contained in the image data to determine contact information corresponding to the face image,
     analyze the audio data to determine contact information matched to the audio data,
     match the audio data to the face image contained in the image data based on the determined contact information, and
     display, on the display unit and along with the face image, an object indicating that the audio data is matched to the face image.

2. The mobile terminal of claim 1, further comprising:
   an audio output module,
   wherein the controller outputs, through the audio output module, the audio data matched to the face image and corresponding to the object when the object is selected.

3. The mobile terminal of claim 1, wherein the controller detects contact information matched to the face image corresponding to the object, and displays, on the display unit, an audio data list containing at least one audio data item matched to the contact information when a preset touch input is sensed on the object.

4. The mobile terminal of claim 3, wherein the controller displays information associated with the at least one audio data item, respectively, on the audio data list.

5. The mobile terminal of claim 4, wherein the associated information comprises at least one of source information, generation time information, or play time information of the at least one audio data, respectively.

6. The mobile terminal of claim 1, wherein when contact information matched to at least one of the face image and the audio data is not stored, the controller receives contact information matched to the at least one of the face image and the audio data, and generates a database containing the at least one of the face image and the audio data and the received contact information.

7. The mobile terminal of claim 6, wherein the display unit displays a contact list containing at least one contact item, and the controller displays an object indicating that the contact information is matched to at least one of the face image or the audio data on a contact item corresponding to the contact information.

8. The mobile terminal of claim 7, wherein when contact information matched to the audio data is not stored, the controller converts the audio data into text data, displays an object containing the text data to be overlapped with the image data, determines contact information matched to the audio data based on a touch input to the object containing the text data, and generates the database to contain the audio data and the determined contact information.

9. The mobile terminal of claim 8, wherein the controller analyzes attribute information of the audio data, and stores the attribute information of the audio data matched to the determined contact information in the generated database.

10. The mobile terminal of claim 9, wherein the attribute information comprises at least one of the frequency information, harmonic information or audio information of the audio data.

11. The mobile terminal of claim 7, wherein when image data containing a face image is received from a server, the controller receives contact information matched to the received face image, and generates the database to contain the received face image and the contact information.

12. A control method of a mobile terminal, the method comprising:
   acquiring an image from a camera to generate image data containing at least one face image;
   receiving audio data from a microphone;
   analyzing a face image contained in the image data to determine contact information corresponding to the face image, and analyzing the audio data to determine contact information matched to the audio data;
   matching the audio data to the face image contained in the image data based on the determined contact information; and
   displaying, along with the face image, an object indicating that the audio data is matched to the face image.

13. The method of claim 12, further comprising:
   outputting the audio data matched to the face image and corresponding to the object through an audio output module when the object is selected.

14. The method of claim 12, wherein said matching the audio data to the face image contained in the image data based on the determined contact information comprises:
   receiving contact information matched to at least one of the face image or the audio data when contact information matched to the at least one of the face image or the audio data is not stored; and
   generating a database containing the at least one of the face image or the audio data and the contact information.

* * * * *